May 8, 1973 E. H. LAND ET AL 3,732,101
PHOTOGRAPHIC FILM UNIT

Filed June 21, 1971 3 Sheets-Sheet 1

INVENTORS
EDWIN H. LAND
and
BY ALBERT J. BACHELDER
Brown and Mikulka
and
Alvin Isaacs
ATTORNEYS May 8, 1973  E. H. LAND ET AL  3,732,101
PHOTOGRAPHIC FILM UNIT
Filed June 21, 1971  3 Sheets-Sheet 2

INVENTORS
EDWIN H. LAND
and
ALBERT J. BACHELDER
BY Brown and Mikulka
and
Alvin Isaacs
ATTORNEYS

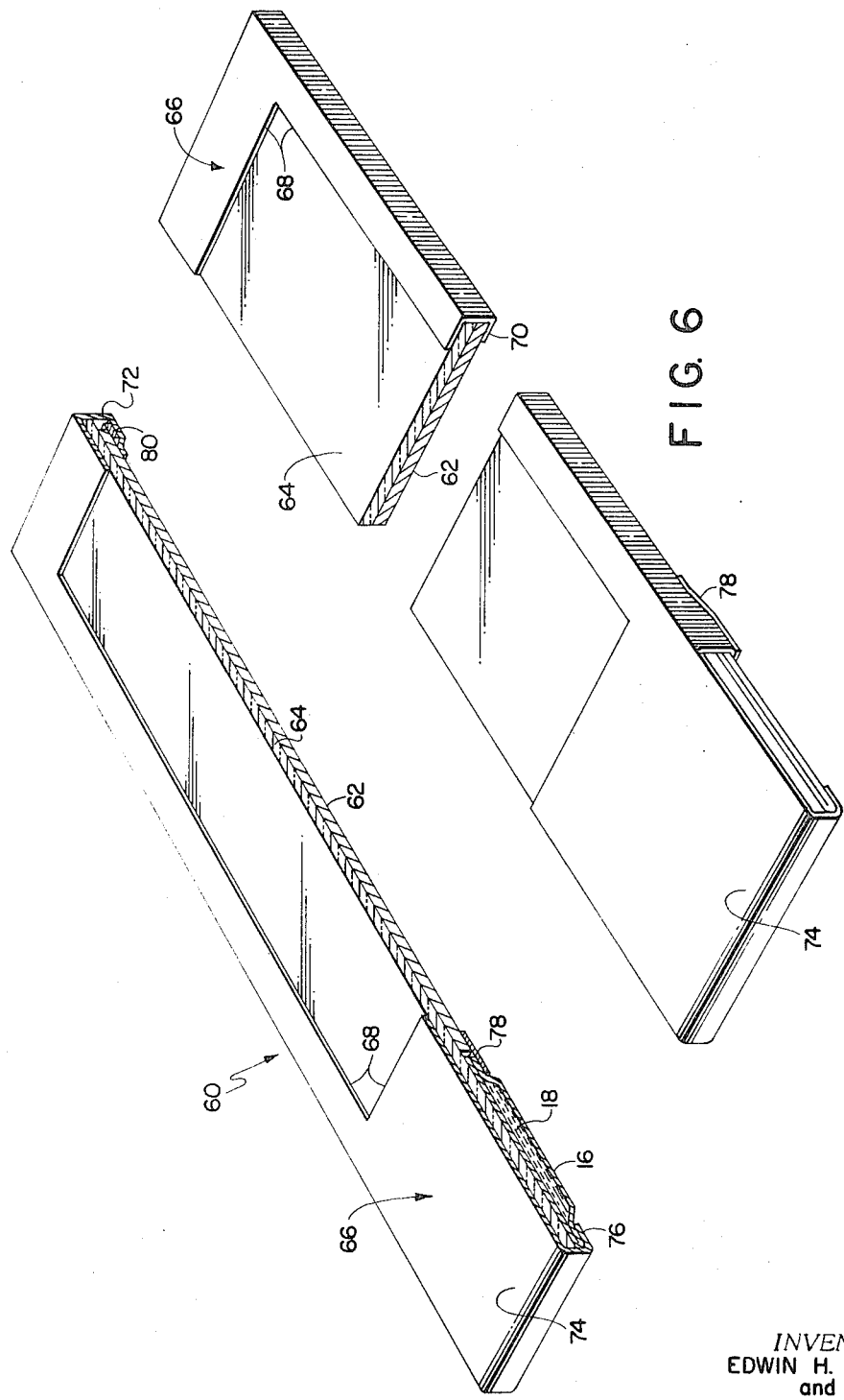

United States Patent Office 3,732,101
Patented May 8, 1973

3,732,101
PHOTOGRAPHIC FILM UNIT
Edwin H. Land, Cambridge, and Albert J. Bachelder, Lexington, Mass., assignors to Polaroid Corporation, Cambridge, Mass.
Continuation-in-part of application Ser. No. 5,799, Jan. 26, 1970, now Patent No. 3,619,192, which is a continuation-in-part of abandoned application Ser. No. 622,286, Mar. 10, 1967. This application June 21, 1971, Ser. No. 155,119
The portion of the term of the patent subsequent to Nov. 9, 1988, has been disclaimed
Int. Cl. G03c 1/48
U.S. Cl. 96—76 C                              22 Claims

ABSTRACT OF THE DISCLOSURE

A photographic film unit comprising all of the materials required to produce a photographic print including a first element which is a photosensitive element, a second element which may be a transparent image-receiving element, a binding element secured to the exterior margins of the first and second elements adjacent three sides of the area to be exposed and processed, and a container of processing liquid secured to the elements adjacent the remaining side of the exposure area. The binding element secures the first and second elements to one another along three sides of the exposure area and preferably also serves as the means for securing the container to the elements adjacent the remaining side of the exposure area. The film unit is designed to be maintained intact throughout and subsequent to exposure and processing in which a processing liquid is discharged from the container and distributed in a layer between the first and second elements over the exposed area to form a transfer image between the elements. The external binding sheet functions to control the thickness of the layer of liquid, to insure sufficient liquid at the edges of the exposed area to provide for complete image formation and to provide a white border for the finished print.

---

This application is a continuation-in-part of the copending application of Edwin H. Land et al., Ser. No. 5,799, filed Jan. 26, 1970, now U.S. Pat. No. 3,619,192, which in turn is a continuation-in-part of Ser. No. 622,-286 filed Mar. 10, 1967, and now abandoned.

Photographic film assemblages have been proposed comprising a photosensitive sheet including a support carrying a photosensitive medium, an image-receiving sheet for supporting an image formed by transfer of image-forming substances from the photosensitive medium and a viscous processing liquid adapted to be distributed between the sheets to effect image formation. The film unit of the invention is of this general type and is especially adapted to be employed in a process of the type disclosed and claimed in the copending application of Edwin H. Land, Ser. No. 622,287, filed Mar. 10, 1967, now U.S. Pat. No. 3,615,539 and in a self-developing camera of the type described in U.S. Pat. No. 3,443,500 issued to Robert L. Norton on May 13, 1969. These disclose processes and apparatus in which the film unit is exposed and processed by moving it relatively rapidly between a pair of pressure applying members.

Processes and apparatus of this type require, and objects of the invention are, to provide a film unit comprising components assembled together to form an integral, unitary structure containing all of the materials, including a processing liquid, required to produce a photographic print and making it unnecessary to store, handle and/or more separately individual components of the film unit; to provide a film unit of the type described comprising a minimum of simple, inexpensive and easily assembled components and materials for controlling distribution and spreading of the processing liquid and insuring the production of high-quality prints; and to provide a film unit structure as described which minimizes the problems of and apparatus required to store, handle, expose and process the film unit and exhibit the print formed thereby.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

The film unit of the invention is adapted to be employed in a self-developing camera of the type shown and described in the aforementional Norton patent in which a completely, self-contained film unit is exposed and then processed by moving it relatively rapidly between a pair of pressure-applying members. A substantial reduction in the complexity of the exposure and processing mechanisms of the camera can be realized by combining the functions of components of the apparatus, specifically, by exposing the film unit during movement thereof by the processing means which may comprise a pair of pressure rollers. This type of exposure and processing system necessitates movement of the film unit during processing at a speed that is relatively rapid, e.g., of the order of nine inches per second, is accurately predetermined, is governed within relatively narrow limits and, in the case of a small, compact camera, must be achieved with a motor having a minimum of power. Exposure and processing of a film unit in a camera such as described presents a number of unique problems affecting the design of the film unit structure in order to enable and facilitate storing, handling and manipulation of the film unit.

The film unit of the invention generally comprises two separate, flexible sheet-like elements including a first or image-recording sheet including a layer containing a photosensitive image-recording material and a second sheet for aiding in the distribution of a viscous liquid processing agent as a layer in contact with an exposed area of the photosensitive material. At least one of the sheets is transparent to provide for exposure of the photosensitive material while the sheets are in superposition and viewing of a transfer image formed by applying the processing agent in a layer between the first and second sheets. This construction enables the two sheets to be secured to one another at their margins to form an integral unit, the integrity of which is established prior to loading into a camera, is maintained throughout exposure and processing and can be maintained subsequent to processing. The processing liquid includes, in addition to the reagents required to produce a diffusion transfer image, a thickening or film-forming agent provided to aid in the formation of a layer or film of the liquid between sheets and an opacifying agent for masking a visible (negative) image formed in the photosensitive layer and providing a background for the diffusion transfer (positive) image formed as a function of development, as will be detailed hereinafter.

In the preferred form, the second sheet is transparent and comprises an image-receptive sheet including and image-receiving layer for forming the diffusion transfer image. In such a construction, the second sheet not only aids in the distribution of the liquid processing agent as a layer in contact with the exposed area of the photosensitive material, but also acts as a support for the transfer image formed by diffusion of image-forming substances from the photosensitive material-containing layer through the layer of processing liquid to the image-receiving layer of the second sheet. In another form of the invention, the first sheet further includes the image-receiving layer to which the image-forming substances diffuse to form the transfer image and the second sheet serves primarily as a spreader sheet to facilitate uniform spreading of the processing agent and to supply additional support to the image formed, as a function of development, in the first sheet. In this latter construction, the image-receiving layer may be disposed on the side of the photosensitive image-recording material opposed from the second sheet, in which event the various layers of the first sheet, including the layer of image-recording material and receiving layer are preferably contained on a dimensionally stable layer or support material which is transparent to permit viewing therethrough of the transfer image. Alternatively, the order of the layers of the first sheet may be reversed with the image-receiving layer disposed closest to the second sheet, i.e., between the second sheet and the layer of image-recording material, in which event at least the second sheet should be transparent to permit viewing therethrough of the transfer image.

Film units of the preferred general type wherein the transfer image is formed in the second sheet are described, for example, in U.S. patents of Edwin H. Land, No. 2,873,658, granted Feb. 17, 1959, and No. 3,053,659, granted Sept. 11, 1962. These patents show structures similar to the film unit of the invention insofar as they include image-recording and image-receptive elements and containers of viscous processing liquid located externally of the elements. Film units of the alternative types wherein the first sheet also contains the image-receiving layer are described, for example, in the application of Howard G. Rogers, Ser. No. 39,646, filed May 22, 1970, now Pat. No. 3,594,165. The film units of the present invention are distinguished by a novel combination of features that fulfill the objectives of the invention particularly with regard to the achievement of an integral two-sheet container and film unit that is easy to store and handle before, during and after exposure and processing, to spread the liquid as a uniform layer of accurately predetermined thickness and produce an attractive finished photographic print comprising a film unit, the integrity of which is maintained throughout and following exposure and processing.

For a fuller understanding of the nature and objects of the invention, reference should be had to the following detailed description taken in connection with the accompanying drawings wherein:

FIG. 6 is a perspective view, partially in section, showing another embodiment of the film unit of the invention.

Figure 1:
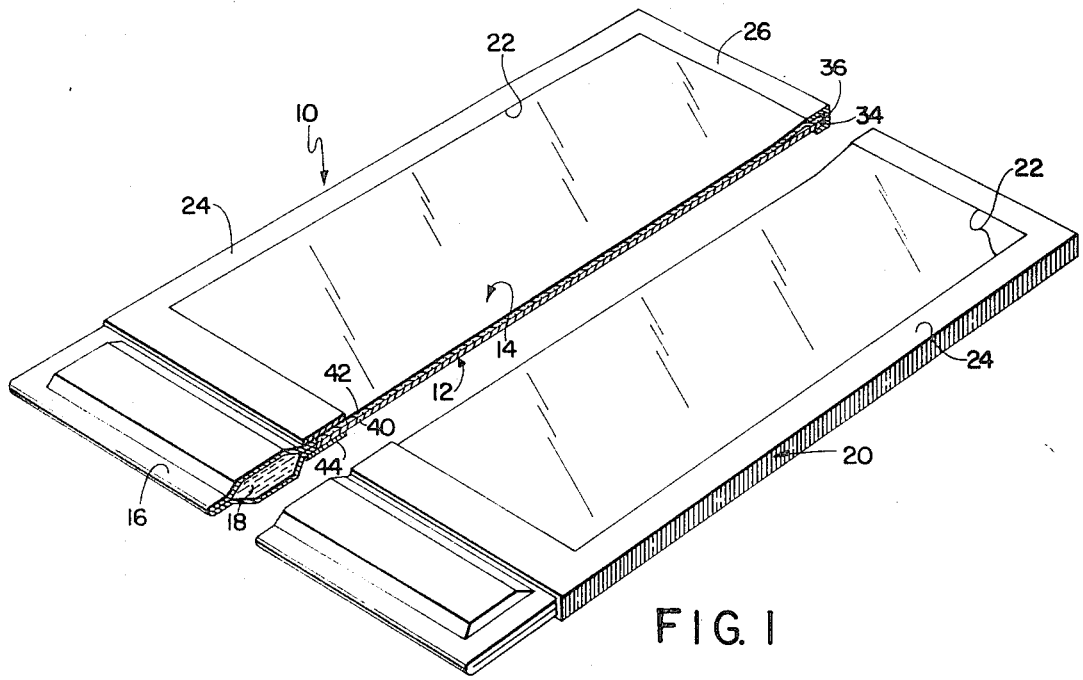
FIG. 1 is a perspective view, partially in section, of a photographic film unit embodying the invention.

The film unit of the invention is adapted to the performance of a number of different image-forming processes and particularly to the production of a positive photographic print preferably in full color produced by a diffusion-transfer process in which a photographic image-recording medium including a photosensitive material such as silver halide is exposed to form an image (latent) therein and is treated by wetting with a liquid processing agent to develop the image in the image-recording medium, for an imagewise distribution of transferable image-forming substances and transfer the image-forming substances by diffusion to an image-receptive stratum in which they are immobilized to form a visible positive image. The film unit may comprise materials for producing a black-and-white print according to a process such as disclosed in the U.S. patents of Edwin H. Land, No, 2,543,181, granted Feb. 27, 1951 and No. 2,662,822, granted Dec. 15, 1953. In this embodiment, the film unit may comprise an image-recording medium including, as the photosensitive material, a silver halide emulsion; a liquid processing agent including a silver halide developer and a silver complexing agent; and the material required to provide a silver precipitating environment in an image-receptive stratum of the film unit during processing. The processing liquid is distributed in contact with the layer containing the exposed image-recording medium for permeation therein to develop the latent image and form a soluble silver complex from unexposed silver halide which is transferred by diffusion to an image-receiving stratum where it is reduced to silver in the presence of a silver precipitant to form a visible positive image. The silver precipitating environment may be provided initially as a layer or stratum on one of a pair of superposed elements comprising the film unit, preferably an element different from the one including the image-recording medium, and/or in the liquid composition distributed in a layer between the elements.

In one preferred form, the film unit contains at least one silver halide layer and associated dye image-providing material capable of providing, as a function of development, an imagewise distribution of soluble and diffusible dye image-providing material which can then be transferred, at least in part, by diffusion, to a dyeable stratum contained in the film unit to impart thereto a color transfer image viewable without separation. Photographic systems employing film units of this description to prepare such color transfer images are disclosed, for example, in U.S. Pat. Nos. 3,415,644; 3,415,645; 3,415,646; 3,573,044; 3,573,043; and 3,576,625; as well as in various copending applications including the aforementioned U.S. Pat. No. 3,594,165; application Ser. No. 867,626, filed Oct. 20, 1969 in the name of Terry W. Milligan, now U.S. Pat. No. 3,597,197; applications Ser. Nos. 846,441, filed July 31, 1969, now U.S. Pat. No. 3,615,421; 3,645 filed Jan. 19, 1970, now U.S. Pat. No. 3,620,724; 43,741 and 43,742 filed June 5, 1970, now U.S. Pats. Nos. 3,647,434 and 3,647,435, respectively, all in the name of Edwin H. Land. As examples of useful image-providing materials mention may be made, for example of those in U.S. Pats. Nos. 2,647,049; 2,661,293; 2,698,244; 2,698,798; 2,802,735; 2,774,668; 2,983,606; 3,443,939; 3,443,940; 3,227,550; 3,227,551; 3,227,552; 3,227,544; 3,243,294; 3,445,228; etc.

A preferred embodiment of the film unit of the invention includes all of the materials and reagents required to produce a full color photographic print by a process such as disclosed in U.S. Pat. No. 2,983,606, issued May 9, 1961, in the name of Howard G. Rogers. This patent discloses a photosensitive element including a silver halide emulsion and a dye developer, that is, a dye which is a silver halide developing agent; a second or image-receiving element including an image-receiving layer of a dyeable material; and a processing liquid in which the dye developer is soluble. The photosensitive and image-receiving layers in face-to-face relation and the processing liquid is distributed in a uniform layer between and in contact therewith for permeation into the photosensitive layer where it initiates development of exposed silver halide. The dye developer is immobilized or precipitated in exposed areas as a consequence of development while in unexposed areas and partially exposed areas of the emulsion, the dye developer remains unreacted and diffusible thereby providing an imagewise distribution of unoxidized dye developer which is transferred, at least in part, by diffusion to the image-receiving layer without altering the imagewise distribution of the dye developer, to form a reversed or positive color image of the developed latent image in the emulsion. Multicolor transfer images are obtained utilizing dye developers, for example, by employing an integral multilayer photosensitive element such as illustrated in FIG. 9 of the 2,983,606 patent, including at least two selectively sensitized overlying photosensitive strata on a single support. A typical photosensitive element of this type comprises a support carrying a red sensitive silver halide emulsion stratum, a green sensitive silver halide emulsion stratum and a blue sensitive silver halide emulsion stratum, the emulsions having associated therewith, respectively, for example, a cyan dye developer, a magenta dye developer and a yellow dye developer. Each set of silver halide emulsion and associated dye developer strata may be separated from other sets by suitable interlayers formed, for example, of gelatin or polyvinyl alcohol. In the example given, the dye developers are preferably selected for their ability to provide colors useful in producing a full color image by a subtractive process and may be incorporated in the respective silver halide emulsion with which they are associated or in a separate layer behind their respective silver halide emulsion. In certain instances, a yellow filter is incorporated located in front of the green sensitive emulsion and comprising a yellow dye developer or a separate layer of a yellow filter material.

Figure 2:
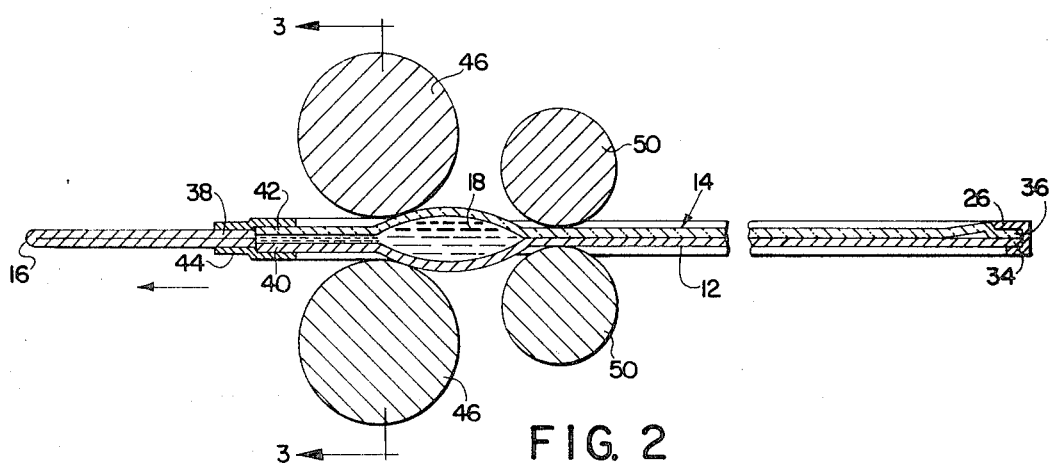
FIG. 2 is a longitudinal, sectional view showing the film unit of FIG. 1 during processing of the film unit.
Figure 3:
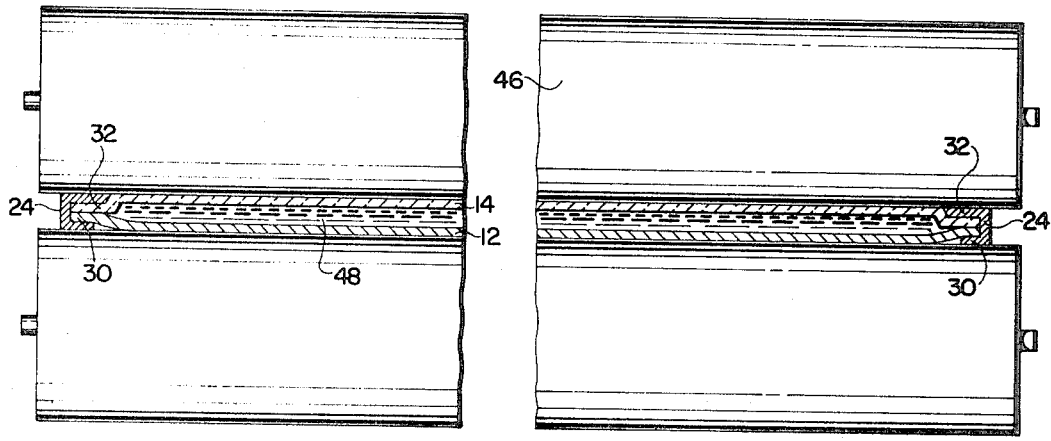
FIG. 3 is a transverse sectional view of the film unit illustrating a step in the process, the section being taken substantially along the line 3—3 of FIG. 2.
Figure 5:
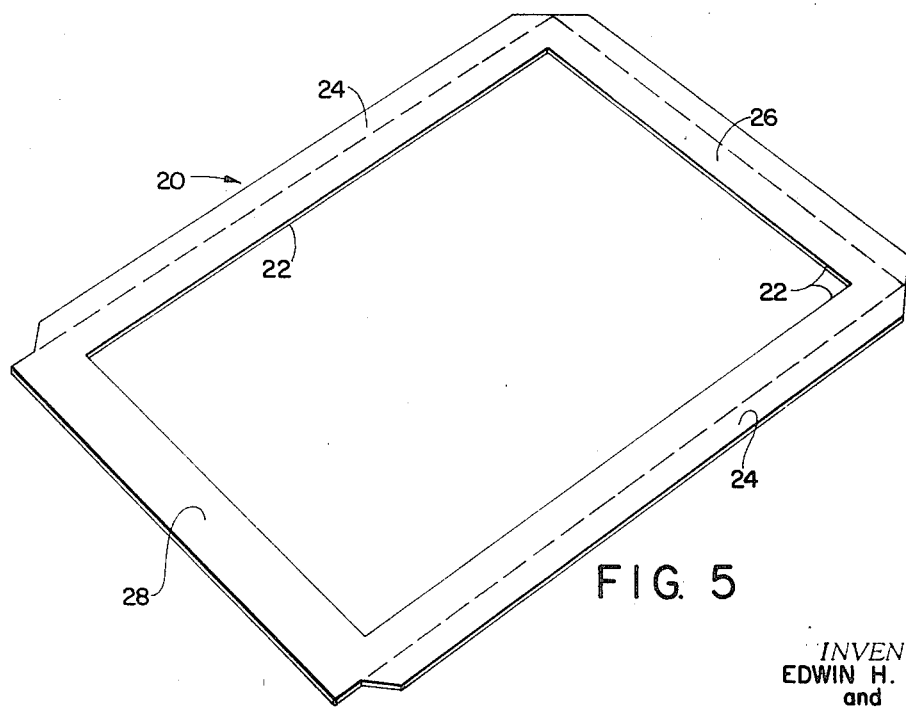
FIG. 5 is a perspective view of a component of the film unit.

Reference is now made to FIGS. 1 through 3 of the drawings wherein there is illustrated a photographic film unit 10 embodying the invention, the thickness of the materials being exaggerated for purposes of clarity of illustration. Film unit 10 comprises a photosensitive or image-recording sheet 12, a second or image-receiving sheet 14 and a rupturable container 16 holding a quantity of processing liquid 18. Sheets 12 and 14 are preferably rectangular and coextensive with one another and are arranged in superposed face-to-face contact with at least one edge of each sheet aligned with an edge of the other. The two sheets are retained in superposed relation by a binding element 20 (shown most clearly in FIG. 5) in the form of a rectangular sheet larger than either of the photosensitive or image-receiving sheets folded along the broken lines and secured to the two sheets at the margins thereof. Binding element 20 is in the general form of a frame having a large rectangular opening 22 defining the extent of the image produced in the film unit, surrounded by lateral edge portions 24 and end portions 26 and 28. Sheet 12 includes lateral marginal portions 30 and an end marginal portion 34 and sheet 14 includes lateral marginal portions 32 and an end marginal portion 36 with the lateral and end marginal portions of the two sheets being located in face-to-face contact, preferably with the edges thereof in alignment. The lateral edge portions 24 and end portion 26 of binding element 20 are secured around and to, respectively, lateral marginal portions 30 and 32 of sheets 12 and 14 and end marginal portions 34 and 36 of the sheets effectively binding the two sheets to one another along three sides thereof. In a preferred form of film unit adapted to produce a reflection print surrounded by a white border and viewed against a white background, at least binding element 20 is formed of an opaque, white material and container 16 may also include a white outer coating to provide a more aesthetically pleasing product.

Container 16 is of the type shown in U.S. Pat. No. 2,543,181, formed by folding a rectangular blank of a fluid impervious sheet material medially and sealing the marginal sections of the blank to one another to form a cavity for containing processing liquid 18. The seal between longitudinal marginal sections 38 of the container is weaker than the end seals so that upon the application of a predetermined compressive force to the walls of the container in the region of the liquid-filled cavity, there will be generated within the liquid hydraulic pressure sufficient to separate longitudinal marginal sections 38 throughout the major portion of their length to form a discharge mouth at least equal in length to the length of the cavity and the width of opening 22 through which processing liquid 18 is discharged. Container 16 is attached to the sheets at the edges thereof opposite end portions 34 and 36, preferably with the longitudinal edge of the container butted against the edges of the sheets and with the discharge passage of the container aligned with the facing surfaces of the sheets. Sheets 12 and 14 include, respectively, end marginal portions 40 and 42 and the means for coupling the container to the sheets include end portion 28 of binding element 20 secured to end marginal portion 42 of sheet 14 and longitudinal marginal sections 38 of the container so as to bridge the container and sheet 14; and a strip 44 secured to end marginal portion 40 of sheet 12 and the other longitudinal marginal section 38 of the container to bridge the gap between the container and sheet 12. The binding element and strip 44 cooperate to provide a liquid-tight seal between the marginal sections of the container defining the discharge mouth thereof and sheets 12 and 14; and form a conduit for conducting the liquid from the container between the sheets at end marginal portions 40 and 42 thereof. In certain instances, e.g., where the image is to be formed in sheet 12, it may be desirable to alter the arrangement of the elements of the film unit so as to reverse this means for coupling the container to the film unit so that the end portion of the binding element is secured to the end marginal portion of sheet 12 and the longitudinal marginal section of the container so as to bridge the container and sheet 12; while strip 44 secures the end marginal portion of sheet 14 and the other longitudinal marginal section of the container to bridge the gap between the container and sheet 14.

The most useful and advantageous film unit insofar as packaging, storing, handling, exposure and processing are concerned is one characterized by an integral, unitary structure constructed so that its integrity may be maintained during and after exposure and processing; and a structure that is sturdy, has some flexibility and can be handled and manipulated by mechanical means without damage, to produce a useful and attractive photographic print. A useful and attractive photographic print can be described as being substantially flat or planar and without a tendency to curl as the result of temperature and humidity changes; as being relatively rigid and inflexible as opposed to being limp or easily bent; as having a uniform white border surrounding a well-defined rectangular image that extends to the border; and a protective coating or covering for the image permitting the print to be handled and stored without the necessity for taking special precautions to avoid damage and deterioration. The structure and composition of components of the film unit of the invention combine to provide a film unit meeting these criteria, and together with the steps involved in the process of the invention, are specially adapted to provide a useful and attractive photographic print, preferably in full color, having the foregoing characteristics.

In order to provide a rigid durable structure having an integrity which is maintained from the time of assembly (during manufacture) to the finished print and providing a protective environment for the photosensitive medium as well as the final image, while permitting exposure of the photosensitive medium and viewing of the final image, at least one of the sheets of the film unit is formed of a transparent material. In the embodiment shown in FIG. 1, the second or image-receiving sheet is transparent and the photosensitive medium is exposed and the final image is viewed through the image-receiving sheet which functions to protect both the image-recording medium and the final image. In other embodiments of the film unit the photosensitive sheet may be transparent depending upon the manner in which the image-recording medium is exposed and the final image is formed and viewed. The transparent image-receiving sheet may be formed of a conventional film base material such as cellulose triacetate coated on its inner surface with one or more layers providing an appropriate environment for the formation of a diffusion transfer image. In a film unit designed to produce a color image in terms of a dye developer, the image-receiving sheet may be prepared as disclosed in the following example, by coating a transparent cellulose triacetate film base in succession with the following layers:

(1) The partial butyl ester of polyethylene/maleic anhydride copolymer prepared by refluxing, for 14 hours, 300 grams of high viscosity poly-(ethylene/maleic anhydride), 140 grams of n-butyl alcohol and 1 cc. of 85% phosphoric acid to provide a polymeric acid layer approximately 0.75 mil thick;

(2) A solution of hydroxypropyl cellulose in water to provide a polymeric spacer layer approximately 0.075 mil thick; and (3) A 2:1 mixture, by weight, of polyvinyl alcohol and poly-4-vinylpyridine, at a coverage of approximately 600 mgs./ft.$^2$, to provide a polymeric image-receiving layer approximately 0.40 mil thick.

In a preferred embodiment of the film unit useful in color photography and incorporating an image-receiving sheet prepared as described above, the image-recording sheet is preferably opaque to actinic light and is prepared, for example, by coating in succession on a gelatin subbed opaque cellulose triacetate film base, the following layers:

(1) A layer of a cyan dye developer dispersed in gelatin;
(2) A red-sensitive gelatino-silver iodobromide emulsion;
(3) A layer of gelatin;
(4) A layer of magenta dye developer dispersed in gelatin;
(5) A green-sensitive gelatino-silver iodobromide emulsion;
(6) A layer of gelatin;
(7) A layer of yellow dye developer dispersed in gelatin;
(8) A blue-sensitive gelatino-silver iodobromide emulsion;
(9) A layer containing 4'-methylphenyl hydroquinone dispersed in gelatin.

The image-recording and image-receiving elements may incorporate other strata and coatings commonly employed in photographic products of this type such as optical coatings for preventing halation and reflection and otherwise improve the optical properties of the sheet material and to facilitate and improve exposure and viewing of the final image. For further details and examples of the composition and structure of image-recording and image-receiving sheets suitable for incorporation in the film unit of the invention, reference may be had to the aforementioned U.S. Pat. No. 3,415,646, issued Dec. 10, 1968; and U.S. Pat. No. 3,362,819, dated Jan. 9, 1968.

The embodiment of the film unit illustrated and described herein is adapted to be exposed and processed to produce a multicolor dye transfer image in a dyeable polymeric layer located between a transparent film on which the dyeable polymeric layer is supported and in an opaque layer located between the image and the photosensitive medium. This opaque layer comprises the liquid contents 18 of container 16 provided in sufficient quantity to form a layer of predetermined thickness, e.g., of the order of .004 inch, when distributed uniformly between the sheets over an area at least coextensive with opening 22 in binding element 20. The quantity of liquid 18 supplied in the container is preferably just sufficient to form a layer of the desired thickness and extent thereby making it unnecessary to provide means for collecting and retaining excess processing liquid and also providing for minimizing the size, quantity and complexity of the container, its contents and the other components of the film unit. The processing liquid contained in container 16 comprises an aqueous alkaline solution having a pH at which the dye developers are soluble and diffusible and contains opacifying agent in a quantity sufficient to mask the dye developers retained in the image-recording layer (laminate) subsequent to processing; and a film-forming viscosity increasing agent or agents to facilitate rupture of the container and distribution of the liquid processing composition and help in maintaining the layer of processing composition as a structurally stable layer tending to bind the sheets to one another.

As a general rule, the opacifying agent or agents will be present in the layer of liquid spread between the transparent image-receiving sheet and the opaque image-recording sheet in a concentration sufficient to prevent further exposure of the image-recording medium by actinic radiation transmitted by the transparent image-receiving sheet. Because the silver halide emulsion or emulsions comprising the image-recording strata are thus protected against exposure by incident actinic radiation at one major surface by the opaque processing composition and at the remaining major surface by the opaque support sheet, it is possible to process the film unit subsequent to distribution of the liquid processing composition in the presence of actinic radiation and thereby eliminate the need to provide a processing chamber within the camera and/or make it possible to withdraw the film unit from the camera almost immediately following distribution of the processing liquid. Binding element 20, strip 44 and the material comprising container 16 are also formed of a material opaque to actinic radiation to prevent exposure of the image-recording medium. The opacifying agent is selected for its suitability as a background and for viewing the dye-transfer image formed in the dyeable polymeric layer as well as for its opaque property. Another factor considered in the selection of the opacifying agent is the requirement that it does not interfere with the formation and color integrity of the dye-transfer image in the image-receiving sheet and that the agent be aesthetically pleasing and does not provide a "noisy" background that may degrade the image or detract from the information content thereof. Opacifying agents particularly desirable for incorporation in the liquid processing composition are those providing a white background for viewing the transfer image and particularly those compositions conventionally employed to provide a background for photographic reflection prints and having optical properties particularly suited for the reflection of incident radiation.

As examples of suitable opacifying agents mention may be made of barium sulfate, zinc oxide, titanium dioxide, barium stearate, silver flake, silicates, alumina, zirconium oxide, zirconium acetyl acetate, sodium zirconium sulfate, kaolin, mica and the like. An opacifying agent especially preferred because of its highly reflection properties is titanium dioxide. In general, based upon percent titanium dioxide (weight volume), a processing composition containing about 4, 10, 20, 30 and 40% titanium dioxide will provide a percent reflectance of about 58, 76, 85, 90 and 99%, respectively. In the most preferred embodiments, the percent reflectance desired will be in the order of about 85%, where it is desired to increase the opaqueness of the processing composition containing, for example, titanium dioxide, beyond that ordinarily obtained, an additional opacifying agent such as carbon black may be added in a concentration of about one part carbon black to 100–500 parts titanium dioxide. A liquid processing composition suitable for incorporation in container 16 for use in combination with sheet materials of the type disclosed in the foregoing example is as follows:

| | Grams |
|---|---|
| Potassium hydroxide | 11.2 |
| Hydroxyethyl cellulose (high viscosity) [commercially available from Hercules Powder Co., Wilmington, Del., under the trade name Natrasol 250] | 3.4 |
| N-benzyl-α-picolinium bromide | 1.5 |
| Benzotriazole | 1.0 |
| Titanium dioxide | 40.0 |
| Water, 100 cc. | |

Reference may be had to the aforementioned Land patents for additional details and examples of liquid processing compositions adapted for incorporation of the invention to effect the process thereof.

Figure 4:
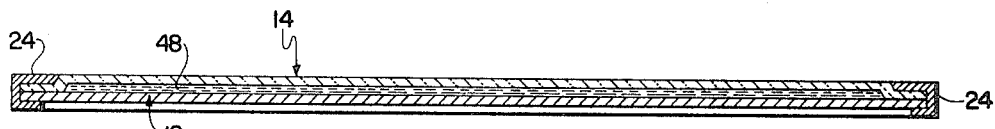
FIG. 4 is a sectional view of the film unit, similar to FIG. 3, illustrating the completed photographic print.

Subsequent to exposure, film unit 10 is processed as illustrated in FIGS. 2 through 4 of the drawings, by moving the film unit with container 16 foremost relative to and between a pair of juxtaposed members for applying compressive pressure first to the container to eject the fluid contents of the container between the photosensitive and image-recording sheets 12 and 14 and then spread processing liquid 18 in a uniform, thin layer between sheets over an area at least coextensive with opening 22 in binding element 20. As previously noted, the processing liquid includes an agent for increasing the viscosity of the liquid so as to promote opening of the discharge passage of the container throughout substantially its entire length and facilitate the discharge of the liquid from the container and spreading of the liquid between the sheets. For this purpose, the liquid should be quite viscous and contain the film-forming material in quantities sufficient to impart a viscosity in excess of 1000 centipoises at a temperature of 20° C., and preferably of the order of 1000 to 200,000 centipoises at said temperature.

Preferred means for spreading the processing liquid in a thin layer of uniform predetermined thickness comprise a pair of cylindrical rolls 46 mounted in juxtaposition for rotation about axes located in a common plane and biased toward one another and/or mounted a fixed maximum distance apart so as to apply compressive pressure to the container and elements of the film unit during movement thereof between the rolls. During movement of the film unit between rolls 46, compressive pressure is initially applied to container 16 generating hydraulic pressure in liquid 18 effecting the rupture of the bond between longitudinal marginal sections 38 of the container and the discharge of liquid 18 in the form of an elongated mass between sheets 12 and 14 at end marginal portions 40 and 42 thereof as shown in FIG. 3. Continued movement of the film unit relative to and between spread rolls 46 causes advancement of the mass of liquid between the sheets toward the opposite end thereof and spreading of the liquid as a thin layer 48 of predetermined thickness between and in contact with the facing surfaces of the sheets.

Components of the film unit cooperate with means in the processing apparatus for appropriately gapping or spacing apart spread rolls 46 for controlling the thickness of the layer of processing liquid distributed between sheets. The film unit illustrated in the drawings is adapted to be employed with cylindrical rolls with the thickness of the liquid layer 48 being controlled, as illustrated in FIG. 4, by components of the film unit itself. The spacing between spread rolls 46 and hence the thickness of the layer of processing liquid is determined by the thickness of the film unit at the lateral margins thereof. This thickness is in turn a function of the thickness of the photosensitive and second sheets 12 and 14 and the thickness of lateral edge portions 24 of binding element 20. Since the photosensitive and second sheets are of substantially uniform thickness throughout, the thickness of layer 48 of processing liquid is determined by the thickness of binding element 20 and is approximately twice the thickness of the binding element. In a typical film unit, for example, the binding element may have a thickness of the order of .002 inch and provide for spreading of the processing liquid in a layer having an initial depth of the order of .004 inch.

Another embodiment of a film unit incorporating the invention is illustrated in FIG. 6 of the drawings. This film unit, designated 60 is basically the same as film unit 10 and may be identical insofar as the composition of the components is concerned. Film unit 60 includes a rectangular photosensitive element 62 located in superposition with a rectangular image-receiving element 64, the latter having a length exceeding the length of element 62 by at least the shorter dimension of container 16 of processing liquid 18. Container 16 is mounted on the extended portion of receiving element 64 adjacent the leading edge of photosensitive element 62 in position to discharge its fluid contents between the photosensitive and image-receiving elements. In addition to being longer, image-receiving element 64 of film unit 60 differs from the image-receiving sheet 14 of film unit 10 in that image-receiving element 64 is substantially planar and is not embossed at its margins, as will be discussed in more detail hereinafter.

Photosensitive and image-receiving elements 62 and 64 are secured to one another at their lateral and trailing end margins by a binding element 66 formed with a rectangular exposure aperture 68 and having lateral edge portions 70 secured around and to the lateral margins of elements 62 and 64 and end edge portion 72 secured around and to the trailing end margins of the photosensitive and second elements. Binding element 66 includes a leading end section 74 extending at least to the leading edge of image-receiving sheet 64 and secured to the forward surface of the image-receiving sheet. Container 16 may be secured to element 64 or, as in the embodiment shown, leading end section 74 of the binding element is folded around the leading edge of element 64 and secured to the edge portion 76 of container 16 to retain the container against the image-receiving element. A binding strip 78 is secured in overlapping relation to the leading edge of the photosensitive element and an edge of container 16 for conducting the processing liquid from the container between the photosensitive and image-receiving elements. While in the embodiment shown in FIG. 6, element 64 is shown to be longer than element 62, it may be desirable in some instances to make element 62 longer than element 64, in which event the general construction of the film unit will be reversed with container 16 then being mounted on the extended portion of element 62. The binding strip would then be secured to container 16 and element 64, a reversal of the manner shown in FIG. 6 for securing the container to elements 62 and 64.

The construction shown in FIG. 6 has the additional advantage eliminating any discontinuity, e.g., difference in thickness, recess, etc. in the image-receiving element in the region where the container abuts the leading edge of the photosensitive element. This is significant in that the driven spread roller 46 which engages the binding element to advance the film unit, experiences no difficulties resulting from such discontinuities. Still further, the single (white) binding element extending from end to end of the print may be more aesthetically pleasing while the extended receiving element may provide a stronger overall structure. A spacing element 80 such as shown and described in the copending U.S. patent application of Richard J. Chen, Ser. No. 726,252, filed May 2, 1968, entitled, "Photographic Film Unit," (now abandoned) is provided engaged between trailing end section 80 of binding elements 66 and the rear surface of the trailing end margin of photosensitive element 62 for collecting and retaining excess processing liquid spread beyond the trailing edge of the photosensitive element.

While, in the embodiment shown in FIG. 6, leading end section 74 of the binding element is folded over element 64 and secured to the edge portion 76 of container 16, with a binding strip securing container 16 to element 62, the binding strip may be eliminated by increasing the length of binding element 66 so that the leading end section 74 may then be folded around the leading edge of element 64, extend over container 16 and then secured in overlapping relation with the leading edge of element 62.

Spreading of the processing liquid to the edges of the area defined by opening 22 in the binding element and formation of a transfer image extending to the edges of this area is important. An important feature of the construction of the film units of this invention is, in turn, providing means for insuring spreading of the processing liquid to the edges of the area defined by the opening in the binding element. This is facilitated by embossing one of the two sheet-like elements at its lateral edges towards the other. In the film unit shown in FIGS. 1 and 2, this may be accomplished by embossing image-receiving sheet 14 at its lateral edges. Lateral marginal portions 32 are displaced out of the plane of the medial portion of sheet 14 toward sheet 12 by a distance or depth approximating the thickness of binding element 20 or, one-half of the desired initial thickness of the layer of processing liquid. This construction helps to provide for the formation of a layer of processing liquid extending substantially to the lateral edges of opening 22 in the binding element. To insure the formation of a layer of processing liquid extending at least to the lateral edges of the opening in the binding element, the edge sections of the lateral edge portions of the binding element secured to the element in which the transfer image is to be formed, e.g., element 12 or 14 of the film unit of FIG. 1, or element 62 or 64 of the film unit of FIG. 6, are wider than the sections of the lateral edge portions at the binding element secured to the other element. In the film units shown for purposes of illustration, the transfer image is to be formed in elements 14 and 64, respectively, and accordingly the edge sections of lateral edge portions 24 and 70 secured to, respectively, marginal portions 32 of sheet 14 and the lateral margins of element 64, are wider than the sections of lateral edge portions 24 and 70 secured to, respectively, marginal portions 30 of sheet 12 and the lateral margins of element 62. As a result, during spreading of the processing liquid between sheets 12 and 14 and elements 62 and 64, the inner surfaces (of the sheets and elements) will be spaced apart in lateral regions extending outside of the edges of opening 22 and opening 68 allowing processing liquid to enter these regions (see FIG. 3) and provide a reservoir of liquid for effecting image-formation within the region of the exposed image-recording medium immediately adjacent the lateral edges of the exposure opening. This is especially important in the case of film unit 60 in which the image-receiving element is planar rather than embossed. Thus, as the processing liquid is absorbed by the photosensitive medium in the regions thereof immediately adjacent the lateral edges of the exposure aperture in the binding element, liquid contained in the region underlying the binding element and constituting this reservoir, is available to complete image formation at the edges of the visible area and thereby avoid the formation of narrow, unsightly areas at the edges of the print where image formation is incomplete.

The processing liquid is initially spread as shown in FIG. 3 in a layer having a depth approximately twice the thickness of the binding element and calculated to provide aqueous liquid sufficient to permeate the layer containing the photosensitive medium and effect formation of a diffusion transfer image. As the liquid permeates the photosensitive layer and is absorbed and/or dissipated by sheets 12 and 14, (or elements 62 and 64) the thickness of layer 48 is reduced and the film-forming agent becomes increasingly solid to provide a dimensionally stable opaque layer providing a background for the transfer image and tending to adhere the sheets to one another to preserve the integrity of the film unit structure. The depth of embossing of image-receiving sheet 14 approximates the final thickness of layer 48 to provide an integral laminated assembly of substantially uniform thickness throughout in which layer 48 and the image extend to the edges of opening 22 in binding element 20.

As previously noted, the film unit of the invention is especially designed to be processed rapidly, that is, to be moved at a relatively high linear rate (e.g., nine inches per second) between spread rolls 46 to distribute the processing liquid in a layer that is continuous, is of uniform depth and extends throughout the entire area within the exposure opening 22 (or 68) of binding element 20 (or 66) while substantially no more than the precise amount of processing liquid required to produce the liquid layer is provided for this purpose. During spreading, as shown in FIG. 2, liquid 18 is advanced between the sheets as a mass located immediately ahead of spread rolls 46 and extending from side-to-side of the region defined by opening 22. It has been discovered that entrainment of air in the liquid may be prevented and enhancement of the spreading rate may be achieved by excluding substantially all air from between the sheets particularly in the region thereof immediately ahead of the mass of liquid during spreading of the liquid. For this reason, and for others, it may therefore be desirable to laminate the two sheets together and then delaminate during spreading of the processing composition, as is disclosed in the copending application of Albert J. Bachelder and Frederick J. Binda, Ser. No. 744,912, filed July 15, 1968, now U.S. Pat. No. 3,652,281, and in the copending application of Edwin H. Land, Ser. No. 804,942, filed Mar. 6, 1969, now U.S. Pat. No. 3,652,282.

It may also be desirable or expedient to provide means for the release of air from between the sheets at the trailing end of the film unit. This may be accomplished, for example, by leaving a portion or portions of the binding element unsealed adjacent the trailing end of the film unit, e.g., by leaving the corners of the binding element defined by end portion 26 and lateral edge portions 24 folded over the sheets but unsealed. It is also contemplated that release of air may be accomplished by providing tiny openings in the form of pin holes or slits along the trailing end of the binding element. It will be appreciated that while these openings, which are substantially invisible, will readily pass air, they will resist passage of the viscous processing composition. Means for permitting release of air in film units of the type contemplated by this invention are further described in the copending application of Edwin H. Land and Albert J. Bachelder, Ser. No. 627,538, filed Mar. 31, 1967, now U.S. Pat. No. 3,615,540, and that of Frank W. Knight, Ser. No. 787,749, filed Dec. 30, 1968, now U.S. Pat. No. 3,619,193. In a film unit construction in which the edge seals provided by the binding element are not completely air-tight, particularly at the end of the film unit furthest from the container, air may be substantially excluded from between the sheets prior to spreading of the processing liquid by maintaining the film unit, at least in the region of the sheets, under a relatively small compressive force to retain the sheets in face-to-face contact throughout substantially the entire area of their facing surfaces.

It is important to the prevention of air entrainment and the facilitation of spreading that air be excluded from between sheets immediately ahead of the advancing mass of processing liquid. For this purpose, and/or to distribute the processing liquid more uniformly, the processing apparatus may be provided with a second pair of pressure applying members shown in FIG. 2 as a pair of juxtaposed rolls 50 located ahead of rolls 46 and spaced therefrom by a distance approximately equal to or slightly greater than the width of the advancing mass of processing liquid so that as the film unit is advanced between rolls 46 to spread the processing liquid, rolls 50 press sheets 12 and 14 into face-to-face contact immediately ahead of the mass of advancing liquid excluding air from between the sheets at least in the region thereof between the rolls distributing the mass of liquid laterally to insure formation of a liquid layer extending into the corners of opening 22 at the end thereof furthest from container 16.

In some instances, it may turn out that the quantity of processing liquid provided in container 16 may, during spreading, prove to be slightly in excess of the minimum required to provide the layer between the sheets and necessitate the provision of means for collecting and retaining this excess liquid. Such means are disclosed in U.S. Pat. No. 2,686,716 and comprise openings in end marginal portion 36 of sheet 14, overlying end portion 26 of binding element 20 and providing recesses in which any excess liquid is collected and retained.

Although the film unit of the invention has been described in terms of a component construction incorporating at least two selectively sensitized photosensitive strata in a contiguous relationship and specifically in terms of a tri-pack structure comprising red, green and blue sensitive silver halide emulsions having associated therewith, respectively, cyan, magenta, and yellow dye developers, the photosensitive medium of the film unit may comprise at least two sets of selectively sensitized minute photosensitive elements arranged in the form of a mosaic screen with each photosensitive element having associated therewith, for example, an appropriate dye developer in or behind its respective silver halide emulsion portion. In general, such a photosensitive screen will comprise red sensitized emulsion elements, green sensitized emulsion elements and blue sensitized emulsion elements having associated therewith, respectively, a cyan, a magenta and a yellow dye developer.

The film unit of the invention is particularly adapted to the production of color images by a variety of additive processes and/or for the production of other visual effects including stereoscopic pictures and cinematography. Additive color images may be produced by employing a suitable screen in place of the transparent image-receiving sheet and for additive color photographs, this screen may comprise a mosaic of minute color filter elements, for example, of the primary colors, red, green and blue, or a lenticular screen. Processes of this type are well known in the art for producing monochrome images, (e.g., black-and-white) which, with the aid of appropriate screens, can be exhibited in full color and/or to produce other visual effects including stereoscopic and cinematographic.

In the preceding description, photographic film units and processes have been described adapted to the production of positive prints either in black-and-white or color adapted to be viewed or exhibited by reflected light. The film units and the processes of the invention are also adapted to the production of visible images designed to be exhibited by light transmitted through the film unit; and in such an embodiment, all of the layers of the film unit would be formed of transparent materials and the visible image may be either a positive or negative image. In the case of a positive transfer image together with a negative image, the higher covering power of the positive image (silver) will enable the positive image to be viewed by transmitted light without any noticeable adverse effect due to the presence of the negative image.

It will be seen from the foregoing that the objects of the invention are achieved in a simple, compact, inexpensive and easily assembled, integral film unit comprising both a minimum of materials and all of the materials and components required to produce a high-quality photographic print, embodied in a structure for controlling the spreading and distribution of the processing liquid so as to insure the formation of a complete, high-quality positive transfer image of a desired shape and extent. The film unit is completely self-contained, being designed so that its integrity is maintained during and following exposure and processing thereby greatly facilitating the storage, exposure and processing of the film unit, contributing to the formation of a print requiring no after-treatment and making possible photographic processes and structures, including novel film pack and camera designs, having advantages heretofore considered impossible to attain.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a photographic film unit comprising a first rectangular sheet including a layer containing a photosensitive material capable of recording an image when exposed to actinic radiation, a second sheet arranged in superposition with said first sheet with said photosensitive material-containing layer located between said sheets, at least one of said first and second sheets including a transparent section for viewing a photographic image formed by exposure and development of said film unit, and a container carrying a predetermined quantity of a liquid processing composition including liquid agents capable of reacting with said photosensitive material following exposure thereof, to produce a visible image, said container including a cavity filled with said liquid processing composition and marginal portions defining the walls of a sealed discharge passage coupled with said cavity and adapted to become unsealed in response to generation of hydraulic pressure within said liquid contained in said cavity to provide for the unidirectional discharge of said liquid from said container, the improvement comprising:

means including at least an external binding sheet having marginal sections secured to marginal portions of said transparent section of said one sheet adjacent the edges of said section, extending around at least the lateral edges and one end edge of said sheets and being secured to marginal portions of said other sheet adjacent the lateral edges and one edge thereof for retaining said sheets in superposition and sealing at least said lateral edges of said sheets against the escape of liquid from between said sheets;

said binding sheet being formed with an exposure aperture for exposing said photosensitive material therethrough; and means coupling said marginal portions of said container with the other end edge of said sheets and for conducting said liquid from said discharge passage between said sheets at said other end edge.

2. A film unit as defined in claim 1 wherein said coupling means includes a strip sealed to one of said marginal portions of said container and the marginal portion of one of said sheets at said other end edge thereof.

3. A film unit as defined in claim 1 wherein said coupling means includes a strip sealed to one of said marginal portions of said container and the marginal portion of said second sheet at said other end edge thereof.

4. A film unit as defined in claim 1 wherein one of said first sheet and said second sheet includes an end section extending beyond the end edge of said other sheet substantially to the edge of said container furthest from said end edge of said other sheet and said container is mounted on said end section of the longer of said sheets.

5. A photographic film unit as defined in claim 4 wherein said binding sheet extends at least to the end edge of said end section of the longer of said sheets and is secured thereto.

6. A photographic film unit as defined in claim 5 wherein said binding sheet includes an end section folded around the end edge of said end section of the longer of said sheets and secured to said container.

7. A film unit as defined in claim 1 including means for insuring spreading of said processing composition discharged from said container between said sheets at least to the edges of said binding sheet defining said exposure aperture.

8. A film unit as defined in claim 1 including means for releasing air from between said first and second sheets.

9. A film unit as defined in claim 8 comprises portions of said binding sheet secured at said one edge or adjacent thereto at at least one of said lateral edges which are adapted for release of air from between said sheets and through said portions of said binding sheet.

10. A film unit as defined in claim 9 wherein said portions comprise tiny openings in said binding sheet.

11. A film unit as defined in claim 9 wherein said binding sheet is secured to said lateral edges and said one edge of said first and second sheet to provide an airtight seal and said portions comprise areas of said binding sheet which are unsealed.

12. In a photographic film unit comprising a first rectangular sheet including a layer containing a photosensitive material capable of recording an image when exposed to actinic radiation, a second sheet including a transparent section at least coextensive with said first sheet, arranged in superposition with said first sheet with said photosensitive material-containing layer located between said sheets, and a container carrying a predetermined quantity of a viscous liquid processing composition including liquid agents capable of reacting with said photosensitive material following exposure thereof, to produce a visible image, said container including a cavity filled with said liquid processing composition and marginal portions defining the walls of a sealed discharge passage coupled with said cavity and adapted to become unsealed in response to generation of hydraulic pressure within said liquid contained in said cavity to provide for the unidirectional discharge of said liquid from said container, the improvement comprising:

means including at least an external binding sheet having marginal sections secured to marginal portions of said section of said second sheet adjacent the edges of said section, extending around at least the lateral edges and one end edge of said sheets and being secured to marginal portions of said first sheet adjacent the lateral edges and one edge thereof for retaining said sheets in superposition and sealing at least said lateral edges of said sheets against the escape of liquid from between said sheets, said binding sheet being formed with a medial exposure aperture; and means coupling said marginal portions of said container with the other end edges of said sheets and for conducting said liquid from said discharge passage between said sheets at said other end edge.

13. A film unit as defined in claim 12 wherein said coupling means comprises means coupling said marginal portions of said container with said sheets at the other end edge of said first sheet and for conducting said liquid from said discharge passage between said sheets at said other end edge, the last-mentioned means including a strip sealed to one of said marginal portions of said container and the marginal portion of said first sheet at said other end edge thereof.

14. A film unit as defined in claim 12 wherein the length of said cavity and the width of said discharge passage are approximately equal to the width of said medial portion of said second sheet and said exposure aperture in said binding sheet.

15. A film unit as defined in claim 12 wherein said binding sheet includes first portions adjacent said exposure aperture secured to said marginal portions of said second sheet and second portions, narrower than said first portions, secured to said marginal portions of said first sheet.

16. A film unit as defined in claim 12 wherein said second sheet includes an end section extending beyond said other end edge of said first sheet substantially to the edge of said container furthest from said other end edge and said container is mounted on said end section of said second sheet.

17. In a photographic film unit comprising a first rectangular sheet including a layer containing a photosensitive material capable of recording an image when exposed to actinic radiation and a layer adapted for receiving a transfer image by exposing said photosensitive material to provide a developable image and then developing said thus exposed material with a liquid processing composition to form an imagewise distribution of image-providing material capable of being transferred, by diffusion, to said image-receiving layer to impart thereto a transfer image; a second sheet including a transparent section at least coextensive with said first sheet, arranged in superposition with said first sheet with said photosensitive material-containing layer located between said sheets, a container carrying a predetermined quantity of a viscous liquid processing composition including liquid agents capable of reacting with said photosensitive material following exposure thereof, to produce a visible image, said container including a cavity filled with said liquid processing composition and marginal portions defining the walls of a sealed discharge passage coupled with said cavity and adapted to become unsealed in response of generation of hydraulic pressure within said liquid contained in said cavity to provide for the unidirectional discharge of said liquid from said container, the improvement comprising means including at least an external binding sheet having marginal sections secured to marginal portions of said section of said second sheet adjacent the edges of said section, extending around at least the lateral edges and one end edge of said sheets and being secured to marginal portions of said first sheet adjacent the lateral edges and one edge thereof for retaining said sheets in superposition and sealing at least said lateral edges of said sheets against the escape of liquid from between said sheets;

said binding sheet being formed with an exposure aperture having edges substantially aligned with the edges of said medial portion of said second sheet; and means coupling said marginal portions of said container with the other end edges of said sheets.

18. A film unit as defined in claim 17 wherein said marginal sections of said binding sheet include first portions adjacent said exposure aperture secured to said marginal portions of said second sheet and second portions, wider than said first portions, secured to said marginal portions of said first sheet.

19. A film unit as defined in claim 17 wherein said first sheet includes an end section extending beyond said other end edge of said second sheet substantially to the edge of said container furthest from said other end edge and said container is mounted on said end section of said first sheet.

20. A film unit as defined in claim 19 wherein said binding sheet extends at least to the end edge of said end section of said first sheet and is secured thereto.

21. A film unit as defined in claim 20 wherein said binding sheet includes an end section folded around the end edge of said end section of said first sheet and secured to said container.

22. In a photographic film unit comprising a first rectangular sheet comprising a transparent support member carrying on one side thereof an image-receiving layer for receiving a dye transfer image and at least one light-sensitive silver halide layer having associated therewith a dye image-providing material for forming said transfer image upon exposure and subsequent application of a liquid processing composition to develop exposed silver halide while providing, as a function of development, an imagewise distribution of diffusible dye image-providing material capable of being transferred, by diffusion, to said image-receiving layer to impart thereto said dye image; a second sheet including a transparent section at least coextensive with said first sheet, arranged in superposition with said first sheet with said photosensitive material-containing layer located between said sheets, a container carrying a predetermined quantity of a viscous liquid processing composition for developing said first unit following exposure thereof, to produce said dye transfer image, said container including a cavity filled with said liquid processing composition and marginal portions defining the walls of a sealed discharge passage coupled with said cavity and adapted to become unsealed in response of generation of hydraulic pressure within said liquid contained in said cavity to provide for the unidirectional discharge of said liquid from said container, between said sheets the improvement comprising means including at least an external binding sheet having marginal sections secured to marginal portions of said section of said second sheet adjacent the edges of said section, extending around at least the lateral edges and one end edge of said sheets and being secured to marginal portions of said first sheet adjacent the lateral edges and one edge thereof for retaining said sheets in superposition and sealing at least said lateral edges of said sheets against the escape of liquid from between said sheets;

said binding sheet being formed with an exposure aperture having edges substantially aligned with the edges of said medial portion of said second sheet, marginal sections of said binding sheet including first portions adjacent said exposure aperture secured to said marginal portions of said second sheet and second portions, wider than said first portions, secured to said marginal portions of said first sheet.

References Cited

UNITED STATES PATENTS

| | | | |
|---|---|---|---|
| 3,619,192 | 11/1971 | Land | 96—76 C |
| 3,607,285 | 9/1971 | Chen | 96—76 C |
| 3,589,904 | 6/1971 | Chen | 96—76 C |

NORMAN G. TORCHIN, Primary Examiner

J. L. GOODROW, Assistant Examiner